United States Patent [19]

Spann

[11] 4,454,801

[45] Jun. 19, 1984

[54] POWER STEERING GEAR AND OPEN CENTER ROTARY VALVE THEREFOR

[75] Inventor: Chris R. Spann, Decatur, Ala.

[73] Assignee: General Motors Corporation, Detroit, Mich.

[21] Appl. No.: 375,715

[22] Filed: May 7, 1982

[51] Int. Cl.³ .............................................. F15B 9/10
[52] U.S. Cl. .............................. 91/375 A; 137/625.24
[58] Field of Search ......................... 91/375 A, 375 R; 137/625.24

[56] References Cited

U.S. PATENT DOCUMENTS

| | | | |
|---|---|---|---|
| 3,022,772 | 2/1962 | Zeigler et al. | 91/375 A |
| 3,393,608 | 7/1968 | Saunders | 91/375 A |
| 4,164,892 | 8/1979 | Goff et al. | 91/375 A |

Primary Examiner—Paul E. Maslousky
Attorney, Agent, or Firm—Charles R. White

[57] ABSTRACT

This power steering valve has new routing for return oil by elongating predetermined slots in the valve body to axially circumvent end ring elements interposed between the valve spool and valve body. With the provision of axial return paths, radially drilled return holes in the valve spool and spool shaft are eliminated.

6 Claims, 5 Drawing Figures

POWER STEERING GEAR AND OPEN CENTER ROTARY VALVE THEREFOR

This invention relates to power steering gears and more particularly to a new and improved rotary valve for controlling oil flow in a power steering gear and featuring axial return oil passages in a valve body element for optimizing oil exhaust which improves operation, facilitates manufacture and reduces costs.

Prior to the present invention power steering gears have employed open center rotary hydraulic valves connected to and actuated by the steering wheel of a vehicle for controlling the flow of fluid between a pressure source and an actuator for effecting the powered steering of dirigible vehicle wheels. Such rotary control valves generally included concentric valve spool and body elements operatively mounted on an input spool shaft and interconnected by a torsion bar such that the spool and valve body elements can be relatively rotated by a vehicle operator to hydraulically connect oil pressure to right or left turn power assist steering chambers until the input is terminated. On termination of such input, the valve elements are centered by the deflected torsion bar for terminating the powered steering. While these prior powered steering gears and valve units have provided high quality steering with long service life they are generally complex in construction and oil routing and are costly and tedious to manufacture. In one prior construction the valve has first and second sets of return oil passages radially drilled into the power steering valve spool on a spool shaft to provide access to an axial passage for the torsion bar therein so that a tortuous return path is provided for oil circulating through the valve. This return path was expensive and tedious to manufacture and did not provide a direct route for returning oil through the valve.

The present invention is drawn to a new and improved control valve for a hydraulically powered steering gear which provides for the advanced oil routing within the valve and which can be readily manufactured with minimized changes to existing valve constructions. With this invention the control valve is improved in construction and operation to provide long service life with minimal maintenance.

It is a feature, object and advantage of the present invention to provide a new and improved open center control valve for a hydraulically powered steering gear with new and improved routing of oil to a return side of a power steering system which can be readily manufactured with minimized changes to existing valves.

Another feature, object and advantage of this invention is to provide a new and improved rotary valve assembly for a power steering gear featuring return slots in the valve body which are deep and elongated to provide axial passages for feeding oil to a discharge port or exhaust within the valve assembly.

Another feature, object and advantage of this invention is to provide a new and improved rotary steering valve assembly for a power steering gear in which passages in the valve body are grooved into slots to provide for axial flow of return oil when the valve is centered or rotated for right or left turn steering to eliminate prior radially drilled exhaust ports within the prior valve constructions.

These and other features, objects and advantages of this invention will be more apparent from the following detailed description and drawing in which.

Figure 1:
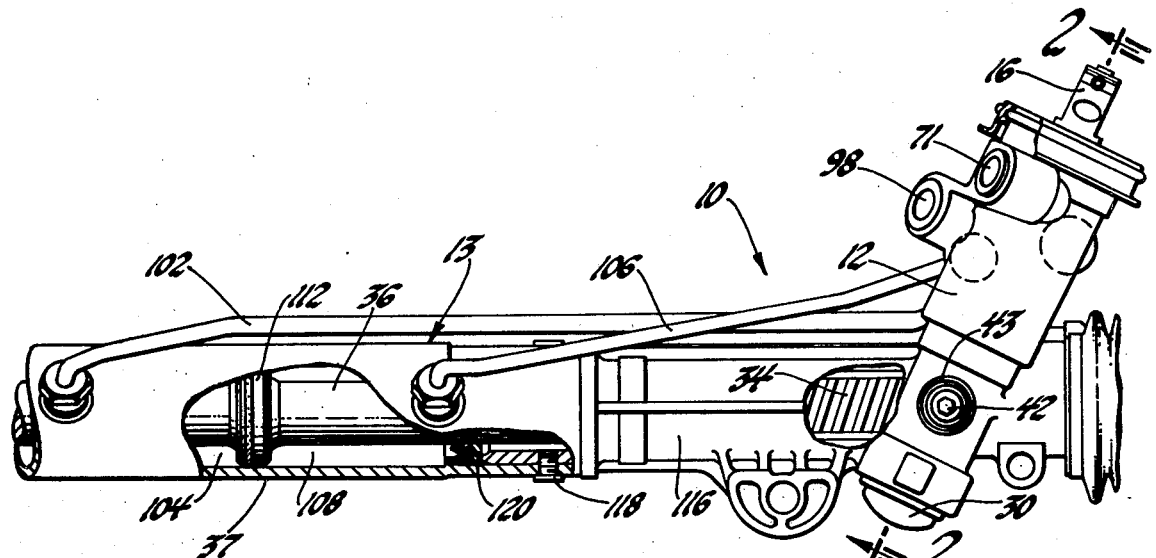
FIG. 1 is an elevational view with parts broken away of a portion of an integral power steering gear embodying this invention.

Turning now in greater detail to the drawing, FIG. 1 shows an integral rack and pinion steering gear 10 having a main housing 12 and a power cylinder 13 coupled thereto. The main housing has a rotary power steering valve assembly 14 mounted therein for actuation by a vehicle operator to effect power assist steering of the dirigible wheels of a vehicle not illustrated. The valve assembly 14 includes an elongated cylindrical spool shaft 16 mounted for turning movement in the main housing 12 by a bearing assembly 18. The spool shaft projects through annular fluid seal 19 closing the upper end of the housing for connection by a conventional steering shaft to a suitable steering wheel which are not shown. The inboard end of the spool shaft 16 is splined at 20 with conventional and predetermined clearance before mechanical drive to a pinion 22, rotatably mounted in the housing by a sleeve bearing 23 and by a ball bearing assembly 24 that receives an extending shank portion 26 of the pinion 22. A nut 28 threaded onto the end of the shank portion 26 outboard of bearing 24 secures the pinion within the housing 12. A cup-like cover 30 fits into the end of the housing 12 at the lower end of the rotary valve to provide a removable access cover therefor.

Figure 2:
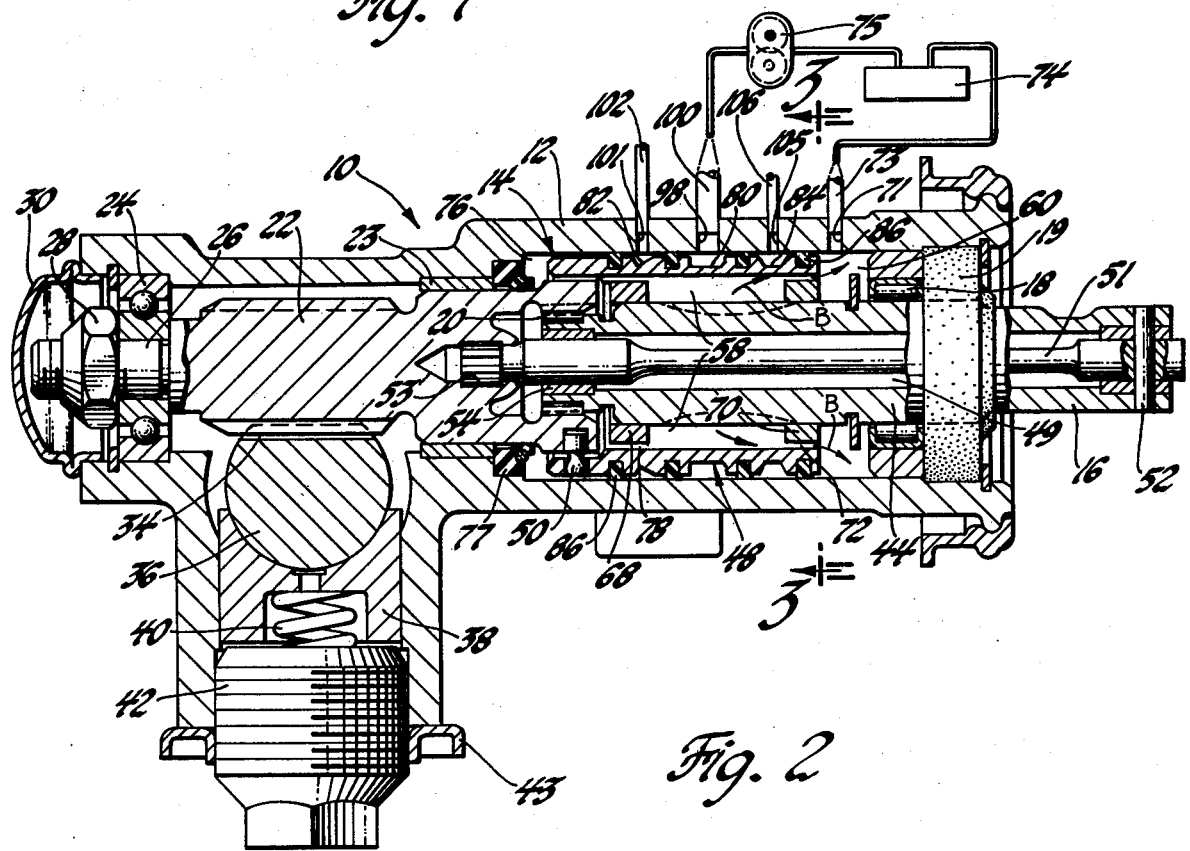
FIG. 2 is a sectional view of a rotary valve of the integral gear of this invention taken along lines 2—2 of FIG. 1 and modified to diagrammatically include external hydraulic circuitry.

As shown in FIG. 2, the teeth of the pinion 22 mesh with a toothed portion 34 of an elongated rack 36 mounted for linear sliding movement within the power steering gear housing 12 and the connected power cylinder housing 37. The opposite ends of the rack are operatively connected to the dirigible wheels of the vehicle by suitable ball joints and tie rods such as shown in U.S. Pat. No. 4,351,228 issued Sept. 28, 1982 to Schultz et al for Power Assist Steering Gear. With such an arrangement the linear movement of the rack turns the dirigible wheels of the vehicle for vehicle steering purposes. The close meshing engagement between the teeth of the pinion and the rack is achieved by the rack contact shoe 38 which is biased by helical spring 40 operatively interposed between the contact shoe 38 and an adjusting plug 42. Plug 42 is threaded into the housing and can be advanced or retracted by a wrench to vary the force of spring 40 and thereby the tooth engagement force between the rack and pinion gears for lash adjustment. An adjuster plug lock nut 43 is threaded onto plug 42 to maintain the plug in a selected position.

The spool shaft 16 of the power steering valve assembly 14 has a cylindrical valve spool 44 integrally formed thereon in which a plurality of longitudinally extending oil transfer slots 46L, 46R are machined. These slots are arcuately and equally spaced in the periphery of the valve spool 44 and provide hydraulic passages which operatively connect pressure oil to right or left turn output holes in a valve body 48 for power assist turns or to exhaust slots in the valve body when power assisted turns are not demanded. The valve body 48 is a cylindrical member rotatably mounted on the valve spool 44 of the spool shaft. The inner end of the valve body extends over the end of the pinion 22 and is drivingly connected thereto by radial pin 50. An elongated torsion bar 51 extends concentrically through an axial opening 49 in the spool shaft 16 to provide a centering spring interconnection between the valve spool 44 and the valve body 48. A pin 52 connects the outer end of the torsion bar to the corresponding end of the spool shaft while the inner end of the torsion bar is splined at 53 to the pinion 22. Bearing sleeve 54 supports the inner end of the spool shaft on a cylindrical portion of the torsion bar. With this torsional spring interconnection, the valve spool 44 can be turned relative to the valve body 48 so that the valve routes pressure oil for power assist steering and furthermore, on termination of the rotational input, the valve body and spool are centered by the torsion bar to terminate power assist steering as explained in U.S. Pat. No. 3,022,772, issued Feb. 27, 1962 to Zeigler et al, for Rotary Power Steering Valve with Torsion Bar Centering assigned to the assignee of the invention and hereby incorporated by reference.

Figure 4:
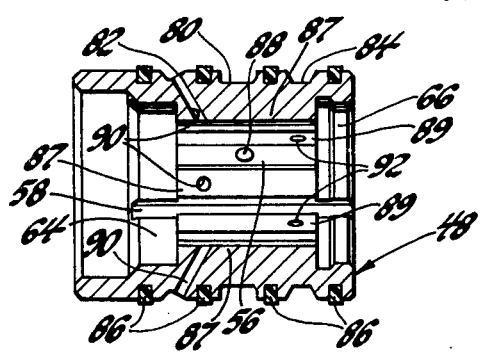
FIG. 4 is a longitudinal sectional view of the valve body of this invention.
Figure 5:
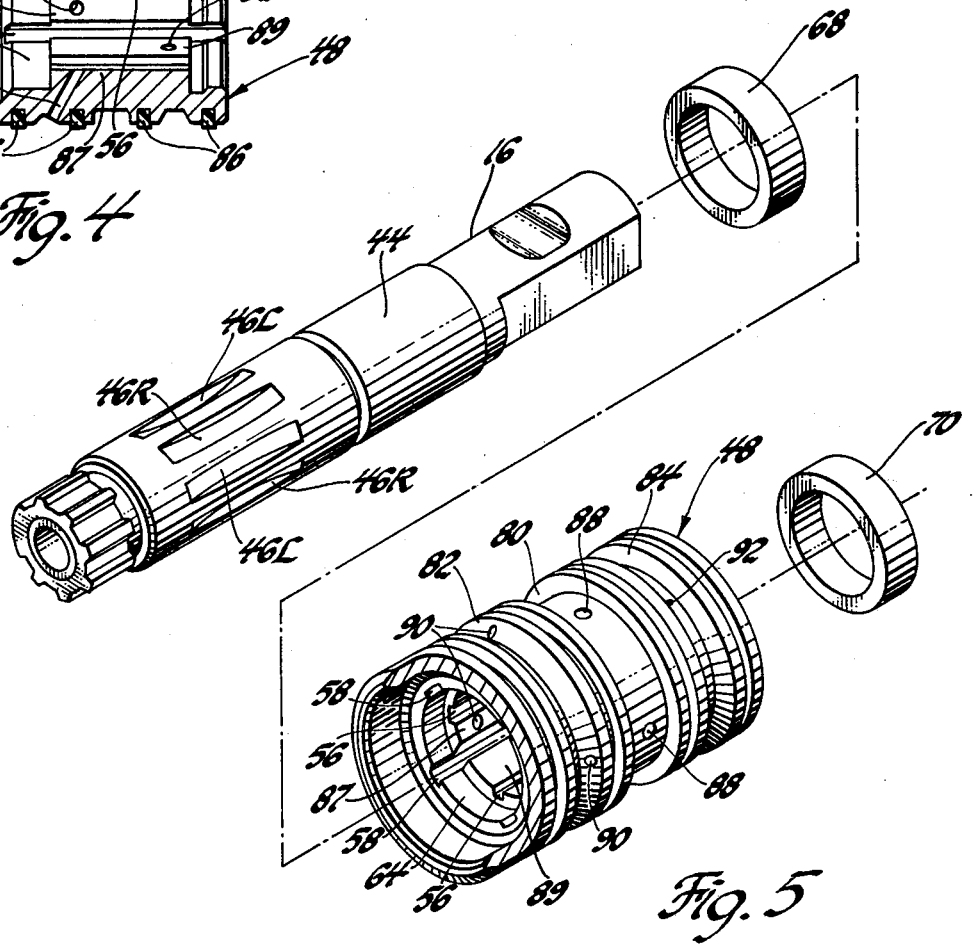
FIG. 5 is an exploded isometric view of the spool shaft and valve body of this invention.

The valve body 48 has internal and longitudinally extending pressure and return slots 56, 58 broached therein. As best shown in FIGS. 4 and 5 the return slots 58 are deeper and longer than the pressure slots 56 to provide passages that lead to an exhaust chamber 60 in the upper end of the main housing 12 for return to power steering gear pump, 75. The interior of the valve body 48 is stepped at the opposite ends of the pressure slots 56 as indicated by numerals 64 and 66 to provide seats for end rings 68, 70. With the end rings 68 and 70 in place pressure slots 56 will be blocked at their ends while the deeper return slots 58 extend over the end rings. The portion of return slots 58 extending over the end ring provides a circular arrangement of axial exhaust passages, identified by numeral 72 in FIGS. 2 and 3, that lead into the end exhaust chamber 60 within the housing 12. Exhaust chamber 60 opens to return port 71 in the main housing that receives a return line 73 that leads to a reservoir 74 for a power steering gear pump 75 illustrated. A chamber 76 at the lower end of the valve body 48, established by annular seal 77 contacting the outer cylindrical surface of the pinion, communicates with the return slots 58 by axial passages 78 which extend over the end ring 68.

The outer diameter of the valve body 48 is formed with three circumferential grooves: a centralized inlet pressure groove 80, a right turn pressure groove 82 and a left turn pressure groove 84. Four external annular seals 86 are interposed in annular recesses in the valve body between grooves 80, 82 and 84 and adjacent the ends of the valve body 48 to sealingly engage the inner cylindrical wall of the main housing 12 and hydraulically seal the grooves from one another. The valve body groove 48 has four centralized radial holes or bores 88 drilled therein which communicate with the internal return slots 56 separated by lands 87 and 89 from the four exhaust slots 58. Inclined holes 90 lead from the right turn groove 82 through the face of lands 87 while radial holes 92 lead from left turn groove 84 through the face of lands 89. The housing 12 has a pressure port 98 formed therein aligned with groove 80 which is connected to the power steering pump 75 by line 100 and receives pressure oil therefrom when the pump is driven by the vehicle engine. Right turn groove 82 is connected by right turn port 101 and line 102 to a right turn pressure chamber 104, FIG. 1, formed in the power cylinder, as shown in FIG. 1, while left turn pressure groove 84 is connected by left turn port 105 and line 106 to a left turn pressure chamber 108 in the power cylinder 13. The right and left turn pressure chambers are established by piston 112 fixed at an intermediate position on the rack 36 inboard of the rack teeth and mounted for sliding movement in the laterally extending power cylinder housing 37. The power cylinder housing 37 has one end which seats onto a shouldered portion of a laterally projecting extension 116 of the main housing 12 and is retained thereon by threaded fastener 118. Annular seal 120 mounted in the power cylinder housing 37 at the end of the cylindrical extension 116 of the main housing sealingly engages the smooth cylindrical surface of the rack 36 to establish chamber 108. The far end of the rack also projects through a similar seal not shown in the outer end of the power cylinder housing 37 to seal chamber 104.

Figure 3:
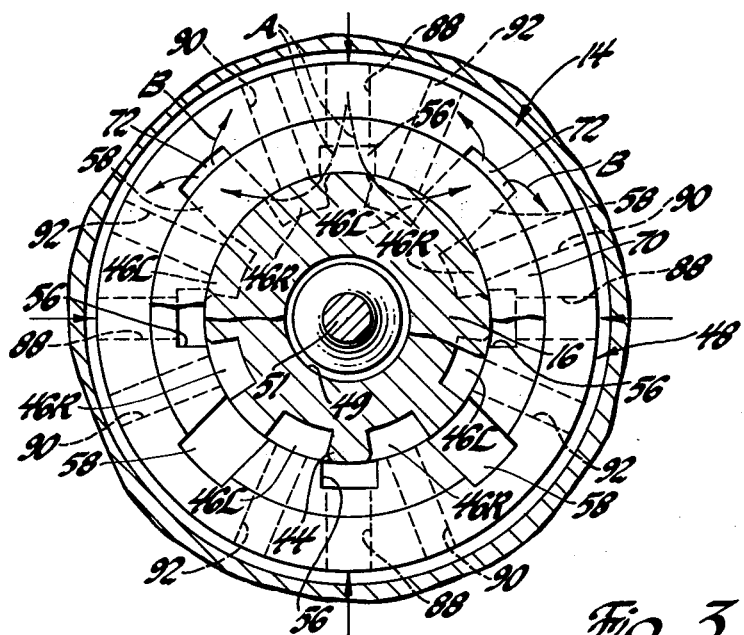
FIG. 3 is a sectional view taken along lines 3—3 of FIG. 2 showing the valve spool and body.

FIGS. 2 and 3 show the rotary valve assembly of this invention in the neutral or straight ahead position. Oil flows from the pump 75 through line 100 to the pressure port 98 and then to the annular pressure groove 80 in the outer periphery of the valve body. From groove 80 pressure oil flows inwardly through the radial holes 88 of the open center valve body into the short pressure slots 56. In the neutral position the valve body 48 is centered relative to the valve spool 44. With the oil transfer slots 46L, 46R of the valve spool centered and hydraulically cracked in relationship to the pressure and return slots 56, 58 in the valve body, pressure oil flows circumferentially from pressure slots 56 into return slots 58 of the valve body as indicated by the flow arrows A in FIG. 3. Oil in the return slots 58 then flows axially, flow arrows B of FIG. 2, through the axial return passages 72 into the exhaust chamber 60. From exhaust chamber 60 the oil flows back to reservoir 74 through the return port 71 and the return line 73. With axial oil flow through passages 73 bypassing end ring 70 described above, a first set of oil return radial return holes in the prior art valve spool section of spool shaft leading to axial passage 49 and a second set of holes leading from axial passage 49 to exhaust chamber 60 to circumvent an end ring such as end ring 70 are eliminated. Accordingly, with the new oil routing provided by further machining existing slots in prior art valve body designs, so that they are longer and deeper for oil return purposes, a more direct and efficient exhaust passage is provided. Furthermore, such machining is more economical and less tedious to manufacture as compared to radially drilling a plurality of holes in the spool shaft. In one power steering gear, this invention eliminated the requirement of ten radially drilled holes in the spool shaft by simply machining four normally required slots to a greater depth and extended length.

In the neutral or straight ahead condition in this invention there is no flow to either side of the chambers 104 and 108 of the power cylinders to power steer the vehicle and the oil pressure on both sides of piston 112 is equal. This oil acts as a cushion that absorbs road shocks so that they are not transferred to the steering wheel thus providing a cushion and more comfortable driving. In addition all passages in the valve assembly are open in the straight ahead position and this valve remains in this position at all times except when steering effort applied to the steering wheel turns spool shaft 16 while winding the torsion bar to produce a specified pressure drop or differential across the valve assembly to effect powered right and left turns hereinafter described.

The open center design of the rotary valve reduces pump losses to a minimum by allowing a minimum restriction to oil flow in the straight ahead position. On turning, due to resistance between the front wheels and the road bed, there is relative rotation between the valve body and the valve spool with the torsion bar deflecting. This relative rotation changes the relationship between the slots in the valve spool and the slots in the valve body. For right turns, the right turn slots 46R on the valve spool are closed off from the return slots 58 in the valve body and are further opened to the pressure slots 56 in the valve body. At the same time the left turn slots 46L of the spool are closed off from the valve body pressure slots 56 and are opened more to the return slots 58. This causes oil to flow into the right turn chamber 104 and force the piston to the right in FIG. 1. As the rack moves it applies turning effort to the dirigible wheel assemblies for vehicle cornering to the right. The oil in the left turn chamber 108 is simultaneously forced through the valve and back to the pump reservoir. The higher resistance to turning between the road bed and the dirigible wheels of the vehicle, the more the position of the valve spool is changed in relation to the valve body and the higher the oil pressure on the piston. Since the amount of hydraulic pressure directed to the right turn chamber is dependent upon the resistance to turning, the vehicle operator is assured of the proper amount of smooth hydraulic assist at all times.

The instant the operator releases the steering wheel the valve body is moved back into the straight ahead position with respect to the valve spool by the pinion and the torsion bar returns to its undeflected state. When this happens the oil pressure is again equal on both sides of the piston and the steering geometry of the car causes the wheel to return to the straight ahead position.

Left turn operation is the opposite to right turn operation so that the left turn port 105 leading to line 106 is open to pressure oil through the valve as the right turn port 101 is opened to the return side of the system by appropriate turning of the spool shaft. Further detailed description of left turn operation and return to center will be apparent to those skilled in the art and are therefore not further described.

The detailed description and illustration of the preferred embodiment of this invention for the purpose of explaining the principles thereof are not to be considered as limiting or restricting the invention since many modifications may be made by the exercise of skill in the art without departing from the scope of the invention as set forth in the following claims.

The embodiments of the invention in which an exclusive property or privilege is claimed are defined as follows:

1. A rotary open center valve and housing assembly for supplying pressure oil from a hydraulic input selectively to first or second hydraulic outputs in the housing comprising a rotatably input member extending into said housing of the assembly, first valve means operatively connected to said input member for rotary movement therewith, a plurality of on transfer slot means arcuately spaced from one another formed in the outer surface of said first valve means, a valve body operatively mounted within said housing for limited turning movement on and relative to said first valve means, said valve body having a plurality of rectilinear open ended oil pressure slots formed internally therein hydraulically connected to said hydraulic input and a plurality of rectilinear open ended oil return slots serially interposed between said oil pressure slots, said housing having an exhaust chamber and an oil return port connected thereto, end ring means sealed in said valve body closing the ends of said oil pressure slots, said oil return slots having rectilinear axial passages extending through at least one end of said valve body and over said end ring means which connect into said exhaust chamber to exhaust oil from said input flowing through said pressure slots and then through said transfer slots into said return slots bypassing said hydraulic outputs when said first valve means and valve body are in a first relative position, said chamber being operative to exhaust oil from said first output while said valve is supplying oil to said second output in a second relatively rotatable position.

2. A rotary valve and housing assembly for supplying pressure oil from a hydraulic input in the housing said assembly selectively to first or second hydraulic outputs in said housing, said housing having an exhaust chamber and an exhaust port connected thereto, a rotatable spool shaft extending into said housing, a cylindrical valve spool in said housing operatively connected to said spool shaft for turning movement therewith, said valve spool having a plurality of elongated fluid transfer slots arcuately spaced from one another in the outer surface thereof, a cylindrical valve body having a cylindrical inner surface operatively mounted on said valve spool and within said housing for limited turning movement relative thereto, torsion bar means extending through said spool shaft and operatively interconnecting said valve body and said valve spool, said valve body having a plurality of oil pressure slots and a plurality of oil return slots formed in the cylindrical inner surface thereof, said oil return slots being interposed between said oil pressure slots, said slots in said valve spool being normally positioned between the slots in said valve body and in hydraulic communication therewith, said oil return slots in said valve body having rectilinear axial extensions which connect into said exhaust chamber to establish the flow of pressure oil through said valve directly from said input to said exhaust bypassing said output when said valve means and said valve body are in a first relative rotated position.

3. A power steering gear for a vehicle comprising a housing having rotatable mechanical input and output means therein, said housing having hydraulic inlet and outlet ports formed therein respectively operatively connected to a source of fluid pressure and a fluid reservoir, hydraulic motor means operatively connected to the dirigible wheels of a vehicle for the hydraulic power steering of the vehicle, first and second conduit means operatively connecting said motor means to said housing, a valve body operatively mounted in said housing having a plurality of fluid directing passages therein, said passages including first rectilinear internal slot means operatively connected to said inlet port and second rectilinear internal slot means disposed to either side of said first slot means, said second rectilinear slot means extending through at least one end of said valve body for to provide a hydraulic connection to said outlet port, and rotating spool valve means operatively connected to said input means having oil transfer slots therein, said spool valve means being movable to a neutral position in which said first internal slot means is hydraulically connected to said outlet port by said second slot means, said spool valve means being further movable in response to movement of said input to a position whereby said first conduit means is connected to said inlet port and the source of fluid pressure and said second conduit means is connected to said outlet port and said reservoir to effect the power assisted steering of the vehicle.

4. A power steering gear for a vehicle comprising a housing having rotatable mechanical input and output means therein, said housing having hydraulic inlet and outlet ports formed therein respectively operatively connected to a source of fluid pressure and a fluid reservoir, hydraulic motor means operatively connected to the dirigible wheels of a vehicle for the hydraulic power steering of the vehicle, first and second conduit means operatively connecting said motor means to said housing, a valve body operatively mounted in said housing having a plurality of fluid directing passages internally formed therein, said passages including first slot means operatively connected to said inlet port and second slot means disposed to either side of said first slot means, said second slot means having a volumetric capacity greater than that of said first slot means, rectilinear axial passage means in said valve body providing an open hydraulic connection of said second slot means to said outlet port, and rotating spool valve means having oil transfer slots thereon and rotatably mounted in said valve body, said spool valve means being operatively connected to said input means and movable therewith to a neutral position in which said first slot means is hydraulically connected to said outlet port by said oil transfer slots and said second slot means and said axial passage means, said spool valve means being further movable in response to movement of said input to a position whereby said first conduit means is connected to said inlet port and the source of fluid pressure and said second conduit means is connected to said outlet port and said reservoir to effect the power assisted steering of the vehicle.

5. In a rotary power steering gear, a rotary valve and housing assembly for supplying pressure oil from a hydraulic pressure oil input in the housing selectively to first or second hydraulic pressure outputs in said housing, said housing having an exhaust chamber and an exhaust port connected thereto, a rotatable spool shaft extending into said housing, said spool shaft having a cylindrical valve spool formed on the inner end thereof for turning movement therewith, said valve spool having a plurality of longitudinally extending fluid transfer slots arcuately spaced from one another in the outer surface thereof, a cylindrical valve body having a cylindrical inner surface operatively mounted on said valve spool and operatively mounted within said housing for limited turning movement relative thereto, torsion bar means extending through said spool shaft providing a centering spring resiliently interconnecting said valve body and said valve spool, said valve body having a plurality of oil pressure slots and a plurality of oil return slots longitudinally extending in the cylindrical inner surface thereof, said oil return slots being interposed between said oil pressure slots, said slots in said valve spool being normally positioned between the fluid transfer slots in said valve body and in hydraulic communication therewith, each of said longitudinally extending oil return slots in said valve body being rectilinear and longer than said oil pressure slots, said oil return slots having an extended open end disposed radially outwardly of said valve spool which feeds directly into said exhaust chamber to establish a direct flow path for pressure oil between said spool shaft and said valve body directly from said input to said exhaust and by-passing said outputs when said valve spool and said valve body are in a predetermined relative rotated position.

6. The rotary power steering gear defined in claim 5 wherein said oil pressure slots and said oil return slots in said valve body extend to opposed ends of said valve body, and blocker ring means disposed in opposite ends of said valve body to hydraulically block the ends of said oil pressure slots, said oil return slots being of a depth greater than said oil pressure slots to provide hydraulic communication with said exhaust chamber around the outer periphery of said blocker ring means.

* * * * *